United States Patent
Reichel et al.

(10) Patent No.: US 8,892,293 B2
(45) Date of Patent: Nov. 18, 2014

(54) TRANSPORT FACILITY FOR AUTONOMOUS NAVIGATION AND METHOD FOR DETERMINING DAMAGE TO A MOTOR VEHICLE

(71) Applicant: Audi AG, Ingolstadt (DE)

(72) Inventors: Michael Reichel, Ingolstadt (DE); Andreas Siegel, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/969,247

(22) Filed: Aug. 16, 2013

(65) Prior Publication Data

US 2014/0052323 A1 Feb. 20, 2014

(30) Foreign Application Priority Data

Aug. 17, 2012 (DE) .......................... 10 2012 017 497

(51) Int. Cl.
 *G06F 17/00* (2006.01)
 *G07C 5/08* (2006.01)

(52) U.S. Cl.
 CPC ............... *G06F 17/00* (2013.01); *G07C 5/085* (2013.01)
 USPC ....................................................... 701/23

(58) Field of Classification Search
 USPC ....................................................... 701/23
 See application file for complete search history.

(56) References Cited

U.S. PATENT DOCUMENTS

| | | | |
|---|---|---|---|
| 4,990,757 A | | 2/1991 | Edwards et al. |
| 6,052,631 A | * | 4/2000 | Busch et al. ................. 701/29.6 |
| 6,470,303 B2 | * | 10/2002 | Kidd et al. ........................ 703/8 |
| 6,630,893 B2 | | 10/2003 | Schuette |
| 7,119,674 B2 | * | 10/2006 | Sefton .......................... 340/521 |
| 7,889,931 B2 | * | 2/2011 | Webb et al. ................... 382/209 |
| 8,483,895 B1 | * | 7/2013 | Beregi ............................ 701/20 |
| 2008/0183535 A1 | | 7/2008 | Kahana |
| 2009/0002364 A1 | | 1/2009 | Witte, II |
| 2010/0274430 A1 | * | 10/2010 | Dolgov et al. ................. 701/25 |
| 2011/0251787 A1 | * | 10/2011 | Gupta et al. .................. 701/201 |

FOREIGN PATENT DOCUMENTS

| | | |
|---|---|---|
| DE | 101 11 421 | 9/2002 |
| DE | 10 2005 012 909 | 9/2006 |
| DE | 10 2006 048 578 | 4/2008 |
| DE | 10 2006 051 246 | 5/2008 |
| WO | WO 91/09275 | 6/1991 |

* cited by examiner

*Primary Examiner* — Thomas Tarzca
*Assistant Examiner* — Alex C Dunn
(74) *Attorney, Agent, or Firm* — Henry M. Feiereisen LLC.

(57) ABSTRACT

Damage caused by accidents that occur during autonomous driving of a motor vehicle should be reliably detected. For this purpose, a transport facility with a driving area which can be autonomously driven by a motor vehicle, has a detection device for detecting a first state of the motor vehicle in an entrance area outside the driving area and for detecting a second state in an exit area located within the driving area. In addition, transport facility has an evaluation device for determining a possible difference between the second state and the first state relating to damage of the motor vehicle.

11 Claims, 1 Drawing Sheet

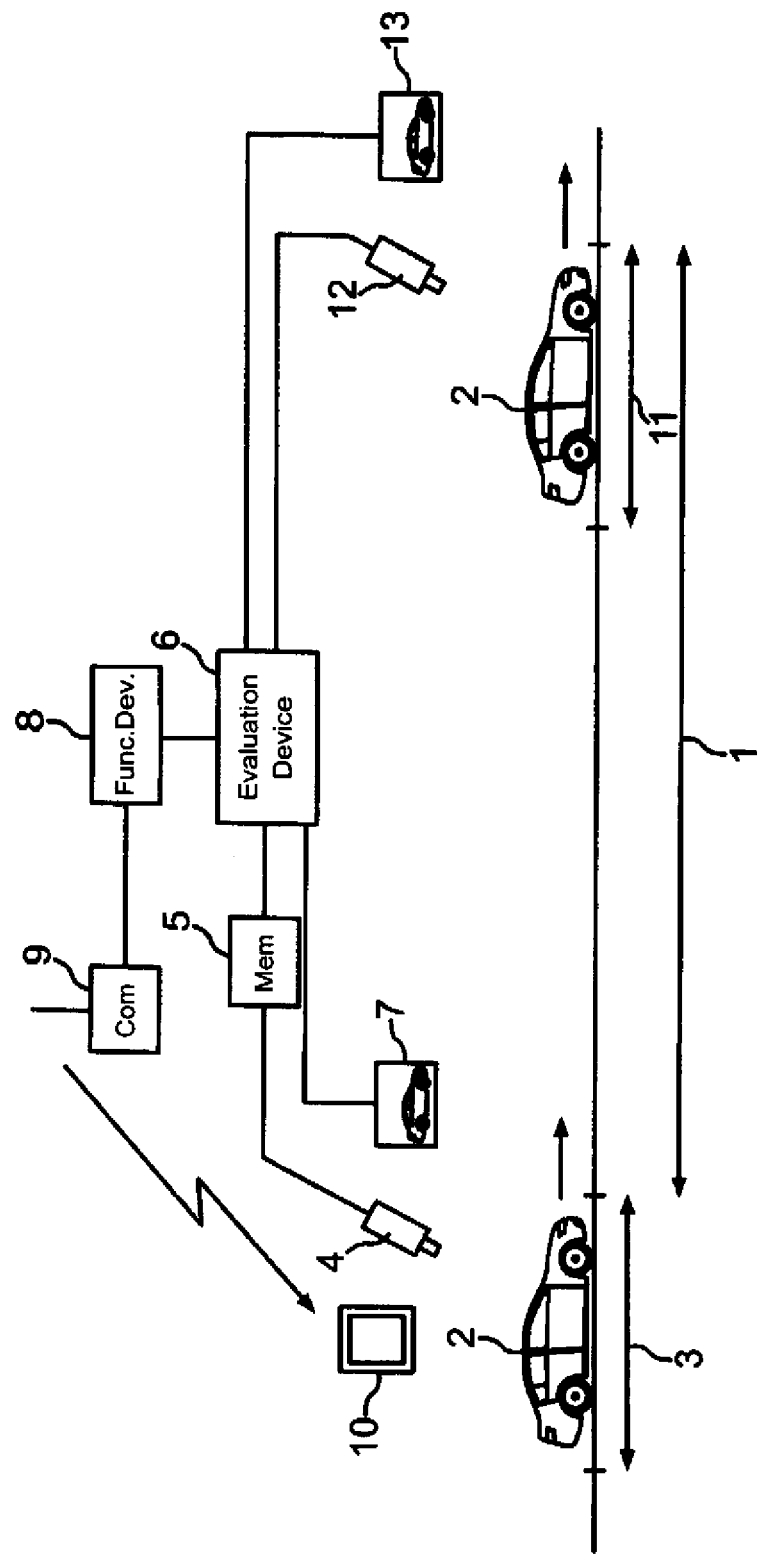

TRANSPORT FACILITY FOR AUTONOMOUS NAVIGATION AND METHOD FOR DETERMINING DAMAGE TO A MOTOR VEHICLE

CROSS-REFERENCES TO RELATED APPLICATIONS

This application claims the priority of German Patent Application, Serial No. 10 2012 017 497.7, filed Aug. 17, 2012, pursuant to 35 U.S.C. 119(a)-(d), the content of which is incorporated herein by reference in its entirety as if fully set forth herein.

BACKGROUND OF THE INVENTION

The present invention relates to a transport facility with a driving area that can be autonomously navigated by a motor vehicle. Moreover, the present invention relates to a method for determining damage to a motor vehicle.

The following discussion of related art is provided to assist the reader in understanding the advantages of the invention, and is not to be construed as an admission that this related art is prior art to this invention.

During operation, motor vehicles are occasionally damaged. Some of the damage is repaired immediately and sometimes the damage is not repaired or repaired later. If the motor vehicle is again damaged and the extent of the damage caused by the second event is to be detected, then this can usually not be identified unambiguously. This frequently creates a situation that in an accident with a vehicle that had prior accident damage, repairs are improperly charged to the last person responsible for the accident.

Another problem regarding the detection of collision damage can occur in autonomous driving where the vehicle drives fully automatically. During autonomous driving, the vehicle orients itself in relation to its surroundings and optionally receives additional information from systems that support fully automatic and autonomous driving. With such fully automated systems, it cannot be excluded that the responsibility for collision damage passes to the system and thus to the vehicle manufacturer or a specialized company. It is important in this context to be able to prove, when in doubt, that damage on the own vehicle or on another vehicle already existed before the accident or there was no accident, since the damage visible at the conclusion of the autonomous driving already existed before the vehicle was switched to fully automatic mode.

Similar challenges with detection of accident damage occur even with vehicles that are manually operated by people. One known solution is the installation of a tachograph. However, this solution has not been taken hold for many reasons. One of these reasons is that sometimes data are recorded which incriminate the owner of the tachograph itself.

It would therefore be desirable and advantageous to obviate prior art shortcomings and to provide an improved transport facility which enables autonomous driving, and with which it can be unambiguously determined whether damage to the vehicle was caused during autonomous driving. In addition, a corresponding method for detecting damage to the motor vehicle is to be provided.

SUMMARY OF THE INVENTION

According to one aspect of the present invention, a transport facility with a driving area which can be autonomously navigated by a motor vehicle, includes a stationary detection device for detecting a first state of the motor vehicle in an entrance area outside the driving area and for detecting a second state in an exit area located within the driving area, and an evaluation device for determining a possible difference between the second state and the first state relating to damage of the motor vehicle. The evaluation is configured to reconcile data from the stationary detection device with onboard vehicle data.

According to another aspect of the present invention, a method for determining damage on a motor vehicle includes detecting a first state of the motor vehicle in an entrance area outside a driving area, autonomous driving in the driving area by the motor vehicle, detecting a second state in an exit area within the driving area, and detecting a possible difference between the second state and the first state relating to damage of the motor vehicle, wherein data from a stationary detection device are matched to onboard vehicle data.

Advantageously, it is thereby possible to reliably verify whether damage to the motor vehicle has occurred or not during autonomous operation of the motor vehicle in the driving area of the transport facility. This is realized by determining the initial state of the vehicle before the autonomous driving in the entrance area and determining the final state of the motor vehicle completion of the autonomous driving, and determining therefrom a state change which indicates conclusively damage to the motor vehicle. The terms "autonomous" and "fully automated" or "fully automatic" are used interchangeably.

According to an advantageous feature of the present invention, the driving area may be a parking lot, a parking facility, a tunnel section or a section of highway. However, the invention can be applied in any other driving areas that can be autonomously driven.

According to another advantageous feature of the present invention, the first and second state of the vehicle may refer to an outer skin of the motor vehicle, because damage to the motor vehicle can be primarily detected on the outer skin. The essential parts of the outer skin of a vehicle are the body and the glass.

The data detection device may optionally receive data transmitted wirelessly from the vehicle and provide these data to the evaluation device for determining any damage. Not only the two determined states, but for example also intrinsic data of the motor vehicle, may then be used for assessing damage during autonomous operation. This data may be stored in the vehicle in an internal memory. For example, the data may have been obtained from one or multiple accelerometers or other accidents sensor that experienced a jerk typical in an accident.

According to another advantageous feature of the present invention, the evaluation device may represent the first state and the second state of the motor vehicle in each case by a model of the outer skin of the motor vehicle. The outer skin can thus be virtually represented and provided at the respective time.

Furthermore, it is advantageous to definitely determine prior to the autonomous or fully automatic mode whether the vehicle has damage. For this purpose, a classification of the vehicle using data from the detection device may be performed by the evaluation device, a preference outer skin may be provided based on this classification, and damage to the motor vehicle may be detected in the entrance area based on the model of the outer skin in the first state and the reference outer skin.

According to another advantageous feature of the present invention, the transport facility may have a communication device configured to transmit the data about the first and/or second state to the motor vehicle or to a mobile device. The driver of the motor vehicle or the operator of the transport facility can then be informed immediately visually or otherwise of the state of the vehicle, especially its damage.

The communication device may advantageously be configured to receive a request and to send the data about the first and/or second state depending on the request. It is then possible to evaluate the vehicle states not only mathematically, but to optionally send relevant information wirelessly also to the driver or the operator of the transport facility.

According to another advantageous feature of the present invention, the evaluation device may be configured to automatically send a message to and/or to receive a message from an external location when damage to the vehicle has been identified. For example, a service provider may hereby be informed about damages that occurred, enabling the service provider then initiate any necessary repairs.

From the features described above in conjunction with the transport facility according to the invention, corresponding process steps may also be inferred with which the method according to the invention above can be further improved.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic diagram of a transport facility according to the present invention with damage detection.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown an exemplary transport facility with a driving area 1, in which a motor vehicle 2 can drive autonomously. This driving area 1 may be a parking lot where the vehicle 2 is automatically steered or driven. However, the driving area 1 may also symbolize a parking garage or a part thereof. Alternatively, the driving area 1 may also be a tunnel section, a section of highway, a ferry deck or the like.

Autonomous or fully automated driving in the driving area 1 is generally implemented by on-board vehicle sensors. The vehicle thereby orients itself on predetermined orientation markers or orientation elements in or around the driving area 1. Optionally, the vehicle control is assisted by sensor elements outside the vehicle which are then part of the transport facility.

Before the vehicle 2 enters the driving area 1 intended for autonomous driving, it enters an entrance area 3, where it is detected, for example, by a camera 4 and/or other sensors. Specifically, the sensors or the camera of the transport facility 4 detect, for example, the outer skin of the vehicle 2. This includes the body, the windows, the wheels, the lights, the outside mirrors etc. Optionally, the sensors also receive data sent by the vehicle 2, for example wirelessly, which include information about any accidents or the like. For example, data from an onboard acceleration sensor or an onboard accident sensor may be stored in a memory of the vehicle 2, providing information about accelerations typical in accidents and jerks experienced by the vehicle. Accordingly, states of the vehicle can then be detected that are not or only minimally reflected in the outer skin of the vehicle. In addition to the video data (photos) relating to the outer skin, for example, measurement data of the skin, such as distance values from a laser scan and other information useful for reconstructing the skin can be recorded in the detection device symbolized by the video camera 4.

The data from the detection device and the video camera 4, etc. can be temporarily stored in a memory device 5. These data than represent the current state of the vehicle 2 in the entrance area 3 before the vehicle 2 enters the driving area 1 for autonomous driving. In this way, the state of the vehicle 2 before the autonomous driving is recorded.

Optionally, the data are forwarded from the memory device 5 or the detection device 4 to an evaluation device 6 which controls, for example, a display device 7. This display device 7 can visually indicate to the driver the state of the vehicle 2 before the autonomous driving and thus informed the driver about the actual state of his vehicle.

Optionally, the data can also be forwarded from the evaluation device 6 via a functional device 8 to a communication device 9 which forwards, for example wirelessly, corresponding image data or other information to a mobile terminal 10 (for example a smart phone). The driver is thus informed by way of the mobile terminal 10 about the current state of his vehicle 2.

After the data acquisition before the autonomous driving in the entrance area 3 is complete, the autonomous or fully automatic driving mode of the vehicle 2 can be activated. Overall, the data acquisition in the entrance area 3 can be initiated automatically by detecting the vehicle in the entrance area. Alternatively, the data acquisition in the entrance area 3 is initiated manually by the driver.

The evaluation device 6 can create from the collected data a model of the outer skin of the vehicle 2 and optionally reconcile the data from different sources by taking into consideration temporal and spatial correlations. This model then virtually represents the state of the outer skin in the entrance area 3, i.e. the first state before autonomous driving.

It may sometimes be convenient to inform the driver or the operator of the transport facility about prior damage to the vehicle before the autonomous operation of the vehicle. This requires that a reference outer skin of an undamaged vehicle of the same type be provided. The evaluation device 6 must therefore classify the vehicle based on the detected data and optionally additional data (Car2X, license plate, etc.). The actual outer skin and the reference outer skin are matched by the evaluation device 6. Differences between the two outer skins may be captured as damages. The result of this match, i.e. the potentially existing damage, is provided upon request or without a specific request, for example, via the display device 7 or to the mobile terminal 10.

In order to unambiguously identify damage, the data from the stationary capture device may also be attached to internal vehicle data. Any preexisting damage may be confirmed or discredited with these internal vehicle data.

At the conclusion of the autonomous driving, i.e. before the vehicle 2 leaves the driving area 1, the vehicle 2 is an exit area 11, which is part of the driving area, whereas the entrance area 3 is not part of the driving area 1. Therefore, before the fully automatic driving mode the vehicle 2 is turned off, its current actual state is again captured with sensors 12 that substantially correspond to the sensors in the entrance area 3. The sensors 12 are also part of the detection device and make it possible to capture the current state at the conclusion of autonomous driving (i.e. the second state). Optionally, the actual state is he also visualized on a stationary display device 13. Alternatively, these data are transmitted, for example wirelessly, to the vehicle or the mobile terminal 10 of the driver.

The analysis device 6 obtains a second virtual model of the exterior skin of the motor vehicle 2 from the data collected in the exit area 11. This second model of the outer skin from the exit area 11 can now be compared to the first model of the vehicle from the entrance area 3. The first model represents hereby the reference model. The difference between the two models represents the damage to the vehicle that arose during the autonomous driving. These data characterizing the damage can again be stored in the memory device 5. These data can be made available by the transport facility in response to a qualified query. In particular, the qualified query can also be made by the vehicle 2 itself, whereafter the data are automatically transmitted to the vehicle 2.

The functional device 8 can here assume the function of receiving the queries for outputting the data. Moreover, it can process the queries and send the information in a special predetermined form. Furthermore, the functional device 8 may optionally also automatically contact a service provider equipped to repair the damage. For example, an appointment with a repair shop can be automatically arranged. Optionally, the functional device 8 also automatically contacts insurance companies or data protection companies or the like. This may be advantageous within the context of damage documentation.

In the simplest situation, photos of the vehicle are captured from all sides (e.g. during handover and when picking up the vehicle at the entrance/exit to the automated parking garage) and stored without further evaluation. Only when the vehicle owner submits a liability claim at a later time can it be determined by evaluating the photos by the operator of the transport facility (here the automatic parking garage) whether these claims are justified.

With the present invention, damages due to prior accidents are reliably determined and documented before the vehicle is switched to autonomous mode in order to prevent unjustified liability claims against the vehicle manufacturer or the parking garage operator while driving in autonomous or fully automated mode. Upon conclusion of the autonomous mode, the integrity of the vehicle can then also be determined to avoid future liability claims arising from damages sustained in a subsequently accident.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transport facility comprising:
   a driving area configured for autonomous navigation by a motor vehicle,
   a stationary detection device configured to detect a first state of the motor vehicle in an entrance area outside the driving area and to detect a second state of the motor vehicle in an exit area inside the driving area, and
   an evaluation device configured to detect a difference between the second state and the first state relating to damage of the motor vehicle, said evaluation device configured to match data from the stationary detection device to internal vehicle data.

2. The transport facility of claim 1, wherein the driving area is an area selected from a parking lot, a parking garage, a tunnel section and a section of highway.

3. The transport facility of claim 1, wherein the first state and second state of the motor vehicle refer to an outer skin of the motor vehicle.

4. The transport facility of claim 1, wherein the detection device is configured to wirelessly receive the internal vehicle data from the motor vehicle, and to provide the received data to the evaluation device for detecting damage to the motor vehicle.

5. The transport facility of claim 3, wherein the evaluation device is configured to represent each of the first state and the second state of the motor vehicle by a model of the outer skin of the motor vehicle.

6. The transport facility of claim 5, wherein the model is represented on a visualization device.

7. The transport facility of claim 5, wherein the evaluation device is configured to perform a classification of the vehicle based on data from the stationary detection device, to provide a reference outer skin based on the classification and to determine damage to the motor vehicle in the entrance area based on the model of the outer skin in the first state and of the reference outer skin.

8. The transport facility of claim 1, further comprising a communication device configured to transmit the data about relating to at least one of the first and the second state to the motor vehicle or a mobile device.

9. The transport facility of claim 8, wherein the communication device is configured to receive a query and to transmit the data relating to the at least one first and second state depending on the query.

10. The transport facility of claim 1, wherein the evaluation device is configured to automatically send a message to from an external location or to receive a message from the external location, or both, when damage to the motor vehicle has been detected.

11. A method for determining damage to a motor vehicle driving in a driving area configured for autonomous navigation, the method comprising:
   detecting a first state of the motor vehicle in an entrance area outside the driving area,
   autonomously driving the motor vehicle in the driving area,
   detecting a second state of the motor vehicle in an exit area located within the driving area, and
   determining a difference between the second state and the first state by matching data from a stationary detection device to vehicle-internal data, with the determined difference relating to damage of the motor vehicle.

* * * * *